United States Patent Office 3,240,842
Patented Mar. 15, 1966

3,240,842
CURABLE MIXTURE OF PARTICULATE POLY-
ALKYLENE ETHER URETHANE AND PARTICU-
LATE POLYALKYLENE ETHER POLYUREA
URETHANE
James H. Saunders, New Martinsville, W. Va., assignor
to Mobay Chemical Company, Pittsburgh, Pa., a cor-
poration of Delaware
No Drawing. Filed Aug. 21, 1961, Ser. No. 132,580
10 Claims. (Cl. 260—858)

This invention relates to polyurethane plastics and a method of preparing the same. More particularly, it relates to polyurethane plastics based on polyalkylene ethers containing urea groups.

It has been heretofore known that urea groups when present in polyurethane formulations suitable for the preparation of elastomeric materials, increase the physical properties of the products, especially with respect to the physical properties at high temperatures. It has, therefore, been desired to incorporate urea groups into the molecular chain of the structure.

It is also known to prepare partially cured polyurethane elastomeric compositions which can subsequently be processed by the use of heat or both heat and pressure to produce a final product having the desired configuration. This process includes the steps of mixing the reactive components of a polyurethane plastic, permitting the reaction to proceed to a semi-cured state wherein the reaction product is a solid thermoplastic, storing the material in this condition until subsequent use is desired and then processing by extrusion, compression molding, injection molding or other techniques known in the art. This process is commonly referred to as the "green stock process," which is broadly defined as a procedure wherein the material is reacted to a semi-cured state and then subsequently further processed without the addition of any further components to form a finally cured product.

It has been found that when an attempt was made to make a semi-cured product utilizing a polyalkylene ether, an organic polyisocyanate and a component which would introduce urea groups into the molecule, the semi-cured product had undersirable storage characteristics for the reason that the terminal —NCO groups would continue to react with the active hydrogen atoms of the urea groups even when the material was stored in the solid state. This caused the disappearance of the excess —NCO groups and, therefore, prevented further processing of the material to the desired final product.

It is, therefore, an object of this invention to provide an improved method of making polyether based semi-cured polyurethane elastomeric materials. It is another object of this invention to provide a method for preparing polyurethane plastics in a semi-cured state wherein urea groups are present in the molecular chain. It is a further object of this invention to provide semi-cured polyurethane plastics based on polyethers containing urea groups in the molecular chain which are storage stable. It is still another object of this invention to provide final products containing both polyether and urea groups in the molecular chain by a green stock process.

The foregoing objects and others, which will become apparent from the following description, are accomplished in accordance with the invention, generally speaking, by providing a curable particulate mixture of polyurethane polymers and a method of preparing the same having a substantially stable —NCO content from a mixture of a polyalkylene ether urethane having terminal —NCO groups and a polyalkylene ether-polyurea-urethane having terminal active hydrogen atoms. In the preparation of the curable particulate mixture of polyurethane polymers having a relatively stable —NCO content, which can be subsequently processed without the addition of other components, a first polymer containing terminal —NCO groups is prepared by reacting a polyhydric polyalkylene ether, a chain extending agent free from primary amino groups and having a molecular weight less than about 500 and having active hydrogen atoms which are reactive with —NCO groups and an organic diisocyanate in a quantity at least sufficient to react with all of the active hydrogen atoms present in the polyalkylene ether and chain extending agent, preparing a second polymer from a polyhydric polyalkylene ether and organic diisocyanate and a compound which will introduce urea groups into the molecule such as water or amines, this compound having terminal active hydrogen atoms because of the excess quantity of compounds containing active hydrogen atoms used in the formulation. The two polymers are then mixed together in the proper proportions. Generally, both polymers will be solid and will have roughly the same particle size to facilitate the intimate mixture of the solid particles. This mixture can then be further processed by techniques known in the art, such as, for example, extrusion, injection molding and the like. It can, thus, be seen that by this method the isocyanate groups are contained within one particle or phase while the urea groups are contained in another particle or phase. Although the particles in the solid form are in contact with each other, or solid particles are in contact with a liquid, reaction between the isocyanate groups in one and the reactive hydrogen atom of the urea groups contained in the other will not take place to an appreciable extent thereby causing the disappearance of the isocyanate groups.

More particularly, the invention contemplates the formation of a green stock in particulate form. Two types of particles, each having a different chemical structure, are intimately mixed in the solid state. This mixture can then be processed without the addition of any other reactive components to form a solid elastomeric product, such as extrusions, compression moldings or injection moldings. In accordance with the process of this invention, it is essential that one particle contains the urea groups while the other particle contains isocyanate groups for the reason that if both groups are present within the same molecule, reaction will continue even though solidification has occurred resulting in the disappearance of the isocyanate groups. When these groups are present in different particles, however, the material in the mixed solid state can be stored over long periods of time without the loss of —NCO groups occurring.

One polymer, for example the one containing terminal —NCO groups, is prepared by reacting a polyhydric polyalkylene ether with an oragnic polyisocyanate and a chain extending agent which will not produce urea groups upon reaction with the isocyanate. The second composition, that is, the one containing urea groups, can be prepared by reacting a polyhydric polyalkylene ether with an oragnic diisocyanate and either water or a polyamine. In the preparation of this composition, polyalkylene ether and the polyamine are used in excess over the amount of isocyanate, so all of the isocyanate groups will react to form either urethane or urea groups.

Any suitable polyhydric polyalkylene ether may be used in the process of this invention for the preparation of either the urea containing polymer or the —NCO terminated polymer such as, for example, the condensation product of an alkylene oxide with a small amount of a compound containing active hydrogen containing groups, such as, for example, water, ethylene glycol, propylene glycol, butylene glycol, amylene glycol and the like. Any suitable alkylene oxide condensate may also be used, such as, for example, the condensates of ethylene oxide, propylene oxide, butylene oxide, amylene oxide and mixtures thereof. The polyalkylene ethers prepared from tetrahydrofuran may be used. Polyalkylene ethers containing more than two hydroxyl groups may also be used as the sole polyether or in mixture with other polyether glycols or polyether polyols. Polyethers having two to three hydroxyls per molecule are preferred. The polyhydric polyalkylene ethers may be prepared by any known process, such as, for example, the process described by Wurtz in 1859 and in the "Encyclopedia of Chemical Technology; volume 7, pages 257 to 262 published in Interscience Publishers in 1951 or in U.S. Patent 1,922,459. The polyhydric polyalkylene ether should have a molecular weight of at least about 600 and preferably from about 600 to about 6000 and an hydroxyl number of from about 20 to about 275.

Any suitable organic diisocyanate may be used in the preparation of either the —NCO terminaed polymer or the urea-containing polymer, such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylenediisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like.

In the preparation of the polymer composition containing terminal —NCO groups, any suitable chain-extending agent which will not produce urea groups may be used such as glycols having a molecular weight less than about 500, for example, ethylene glycol, propylene glycol, butylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxy-methyl-cyclohexane), hexanediol, thiodiglycol, and the like.

In the preparation of the urea-containing polymer, either water or any suitable polyamine may be used, such as, for example, ethylene diamine, propylene diamine, butylene diamine, hexamethylene diamine, cyclohexylene diamine, phenylene diamine, tolylene diamine, xylylene diamine, 4,4'-diaminodiphenyl methane, 3,3'-dichlorobenzidine, 3,3' - dinitrobenzidine and the like. The polyamine should have a molecular weight of less than about 500 for best results. Other compounds which can introduce urea groups into the polymer may also be used, such as, for example, amino alcohols, hydroxyalkyl ureas, and the like. Any suitable amino alcohols such as, for example, aminoethanol, aminopropanol, aminobutanol and the like may be used. Any suitable hydroxy-alkyl urea may be used such as, for example, 1,3-bis-(hydroxy methyl) urea, 1,3-bis-(hydroxy ethyl) urea, the reaction product of two mols of ethanol amine with one mol of tolylene diisocyanate and the like.

In the preparation of the isocyanate-terminated polymer, the polyhydric polyalkylene ether may first be reacted with an excess quantity of an organic diisocyanate and the reaction product thereof, further reacted with a suitable chain-extending agent to yield an isocyanate-terminated polymer containing urethane linkages. In another embodiment of the invention, the reactive components, i.e., a polyhydric polyalkylene ether and an organic polyisocyanate and a chain-extending agent may be all mixed simultaneously. In either example, the reaction mixture is permitted to react to a semi-cured state by any suitable means such as casting onto a heated surface until solidification occurs. The solid mass is then immediately removed from the surface and subsequently reduced in particle size by chopping, grinding, pelletizing or any other means well known in the art. The molar ratio of the chain extender to the polyhydric polyalkylene ether for the polymer should preferably be from about 0.1 to about 50 with the —NCO/OH being from about 1.02 to about 1.3.

In the preparation of the urea-containing polymer, either a two-step procedure of reacting a polyhydric polyalkylene ether with an organic diisocyanate and then reacting the product thereof with an organic diamine or water or a single-step procedure of simultaneously admixing all three components may be used. In the preparation of this polymer, a deficiency of the isocyanate is used to prepare a product having terminal active hydrogen atoms. As above the reaction mixture is cast onto a heated surface where solidification occurs. The solid mass is then removed and reduced in particle size. The molar ratio of water or diamine to polyhydric polyalkylene ether for this polymer should preferably be from about 0.05 to about 5 with the ratio of —NCO to total active hydrogen groups in the reactants being about 0.60 to about 0.99.

The two different type particles are then mixed together in the desired proportions and either used immediately in the preparation of a final object or stored in this condition. The mixed particles can be stored indefinitely at room temperature without a susbtantial depreciation of —NCO groups. The urea-containing particles and isocyanate-terminated particles should be mixed in a ratio of 5:95 parts by weight to about 95:5 parts by weight, respectively, so that the ratio of —NCO equivalents in the one polymer to the equivalents of terminal active hydrogen groups in the other polymer in the resulting mixture should range from about 0.9 to about 1.2 with a value greater than 1 being the most preferred. These values are necessary to the resulting products having the desired physical properties.

The invention is further illustrated by the following examples in which parts are given by weight unless otherwise specified.

*Example 1.—Preparation of an —NCO-terminated polymer*

About 100 parts of a polypropylene ether glycol having a molecular weight of 1000 are mixed with about 44 parts of a mixture of isomers of tolylene diisocyanate containing 80 percent of the 2,4-isomer and 20 percent of the 2,6-isomer. This mixture is heated to about 70° C. for about three hours. About 19 parts of the bis-(β-hydroxy ethyl ether) of hydroquinone heated to about 105° C. are mixed into the glycol-isocyanate mixture for about 30 seconds at a temperature of about 100° C. This reaction mixture is immediately poured onto a preheated table and heated at a temperature of about 100° C. The material is then removed shortly after solidification occurs and is chopped.

*Example 2.—Preparation of a urea-containing polymer*

About 100 parts of a polypropylene glycol having a molecular weight of about 1000 and 44 parts of the isomer mixture of tolylene diisocyanate set forth in Example 1 are mixed and heated for about three hours at 70° C. About 19.5 parts of a mixture of tolylene diamine containing 80 percent of the 2,4-isomer and 20 percent of the 2,6-isomer are stirred into the polypropylene for about 15 seconds. The reaction mixture is then cast into ⅛ inch layers on a metal surface maintained at 50° C. When solidification occurs, the material is removed from the surface and chopped to reduce the particle size.

*Example 3*

About 25 parts of the product of Example 1 and about 75 parts of the product of Example 2 are intimately mixed in the solid condition. A portion of this mixture is extruded into a thread which is cured for about 4 hours at 120° C.

Another portion of this mixed product is compression molded and subsequently cured at 120° C. for 4 hours.

A third portion is injection molded and cured at 120° C. for 4 hours.

*Example 4.—Preparation of an —NCO-terminated polymer*

About 1000 parts of a polypropylene ether glycol having a molecular weight of about 1000 are mixed with about 383 parts of a mixture of isomers of tolylene diisocyanate containing 80 percent of the 2,4-isomer and 20 percent of the 2,6-isomer. This reaction mixture is heated to about 70° C. and maintained at this temperature for about 3 hours. The resulting polymer has an —NCO/OH of about 2.2 with about 7.0 percent free —NCO groups. To 100 parts of this —NCO terminated polymer is added about 14 parts of the bis-(β-hydroxy ethyl ether) of hydroquinone which has been previously heated to about 105° C. The reaction mixture is maintained for about 24 hours resulting in a soft material having an —NCO/OH of about 1.3.

*Example 5.—Preparation of a urea containing polymer*

To about 100 parts of the —NCO terminated polymer of Example 4 which has an —NCO/OH of 2.2 and an —NCO content of about 7 percent is added 15 parts of toluylene diamine. This reactive mixture is vigorously mixed and immediately cast onto a heated surface maintained at a temperature of about 50° C. Solidification occurs immediately upon which the material is immediately removed and permitted to come to room temperature. The resulting product has an —NCO/active hydrogen group ratio of about .98 and is a hard solid having a melting point of between 450 and 500° F.

*Example 6*

The solid materials of both Examples 4 and 5 are ground separately to a particle size of about 4–25 mesh. To 100 parts of the solid ground material of Example 5 is added respectively 5, 10, and 20 parts of the solid polymer of Example 4. The resulting mixtures are separately poured into the hopper of an extruding machine and extruded into filaments which exhibit outstanding physical properties, especially at high temperatures.

It is to be understood that the scope of the invention is not to be limited by the specific examples as set forth but that any of the polyhydric polyalkylene ethers, organic polyisocyanates, polyhydric alcohols or polyamines set forth above may be substituted for those specifically utilized in the examples.

Although the invention has been described in considerable detail for the purpose of illustration, it is to be understood that variations may be made therein by those skilled in the art without departing from the spirit of the invention and the scope of the claims.

What is claimed is:

1. A storage stable curable mixture of solid polyurethane polymers having a substantially stable —NCO content which comprises as the sole reacting components solid particles of a polyalkylene ether urethane having terminal —NCO groups and solid particles of a polyalkylene ether polyurea urethane having terminal active hydrogen atoms.

2. A storage stable mixture of solid polyurethane polymers having a substantially stable —NCO content which comprises as the sole reacting components from about 5 to about 95 parts by weight of solid particles of a polyalkylene ether urethane having terminal —NCO groups and from about 95 to about 5 parts by weight of solid particles of a polyalkylene ether polyurea urethane having terminal active hydrogen atoms.

3. A method of making a storage stable curable mixture of solid polyurethane polymers having a relatively stable—NCO content which comprises preparing solid particles of a first polymer having terminal —NCO groups and containing substantially no urea groups by reacting until a solid polymer results a polyhydric polyalkylene ether having a molecular weight of from about 600 to about 6000, and a dihydric alcohol having a molecular weight less than about 500 with an excess of an organic diisocyanate to obtain an —NCO to —OH ratio of from about 1.02 to about 1.3, preparing solid particles of a second polymer having terminal active hydrogen atoms and containing urea groups by reacting to a solid condition, a polyhydric polyalkylene ether having a molecular weight of from about 600 to about 6000 and a member selected from the group consisting of water, diamines, amino alcohols and hydroxy-ureas with an organic diisocyanate, the quantity of said polyhydric polyalkylene ether and said group member being in excess of that required to react with said organic diisocyanate to obtain an —NCO to active hydrogen group ratio of from about 0.60 to about 0.99 and mixing in particulate form as the sole reacting components said first solid polymer with said second solid polymer to obtain an overall —NCO to active hydrogen group ratio of from about 0.9 to about 1.2.

4. A method of making a storage stable curable mixture of solid polyurethane polymers having a relatively stable —NCO content which comprises preparing solid particles of a first polymer having terminal —NCO groups and containing substantially no urea groups by reacting until a solid polymer results a polyhydric polyalkylene ether having a molecular weight of from about 600 to about 6000, and a dihydric alcohol having a molecular weight of less than about 500 with an excess of an organic diisocyanate to obtain an —NCO to —OH ratio of from about 1.02 to about 1.3 and reducing the particle size of said solid, preparing solid particles of a second polymer having terminal active hydrogen atoms and containing urea groups by reacting to a solid condition, a polyhydric polyalkylene ether having a molecular weight of from about 600 to about 6000 and a member selected from the group consisting of water and diamines, amino alcohols and hydroxy-ureas with an organic diisocyanate, the quantity of said polyhydric polyalkylene ether and said group member being in excess of that required to react with said organic diisocyanate to obtain an —NCO to active hydrogen group ratio of from about 0.60 to about 0.99 and reducing the particle size of said second polymer, and mixing in particulate form as the sole reacting components said first solid polymer with said second solid polymer to obtain an overall —NCO to active hydrogen group ratio of from about 0.9 to about 1.2.

5. The process of claim 3 wherein the organic diisocyanates are aromatic diisocyanates.

6. The process of claim 3 wherein the organic diisocyanates are tolylene diisocyanates.

7. The process of claim 3 wherein the organic diisocyanates are 4,4'-diphenyl methane diisocyanates.

8. The process of claim 3 wherein each of the polyhydric polyalkylene ethers used is a polypropylene glycol having a molecular weight of from about 600 to about 3,000.

9. The process of claim 3 wherein each of the polyhydric polyalkylene ethers used is a polypropylene triol having a molecular weight of from about 1,000 to about 3,000.

10. The process of claim 3 wherein each of the polyhydric polyalkylene ethers used is a mixture of a polypropylene triol and a polypropylene glycol.

References Cited by the Examiner

UNITED STATES PATENTS

| | | | |
|---|---|---|---|
| 2,814,606 | 11/1957 | Stilmar | 260—858 |
| 2,921,923 | 1/1960 | Bruin et al. | 260—47 |

MURRAY TILLMAN, *Primary Examiner.*

LEON J. BERCOVITZ, *Examiner.*